Nov. 13, 1962   S. ROBERTS   3,063,643
LAWN SPRINKLING CONTROL SYSTEM
Filed Aug. 14, 1958   4 Sheets-Sheet 1

INVENTOR.
SIMON ROBERTS
BY
Donnelly, Maentz & Harrington
ATTORNEYS

Nov. 13, 1962 S. ROBERTS 3,063,643
LAWN SPRINKLING CONTROL SYSTEM
Filed Aug. 14, 1958 4 Sheets-Sheet 2
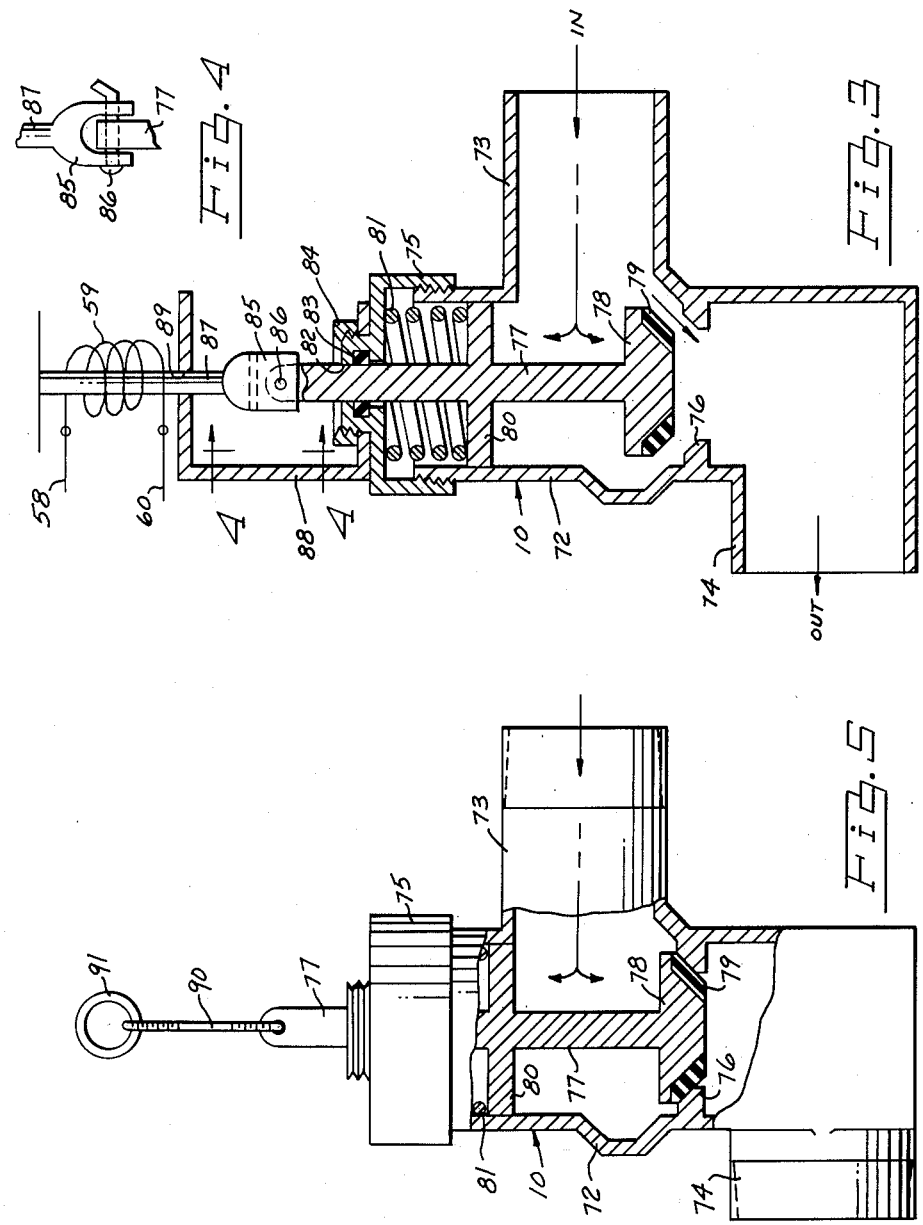
INVENTOR.
SIMON ROBERTS
BY
Donnelly, Mentag & Harrington
ATTORNEYS Nov. 13, 1962   S. ROBERTS   3,063,643
LAWN SPRINKLING CONTROL SYSTEM
Filed Aug. 14, 1958   4 Sheets-Sheet 3
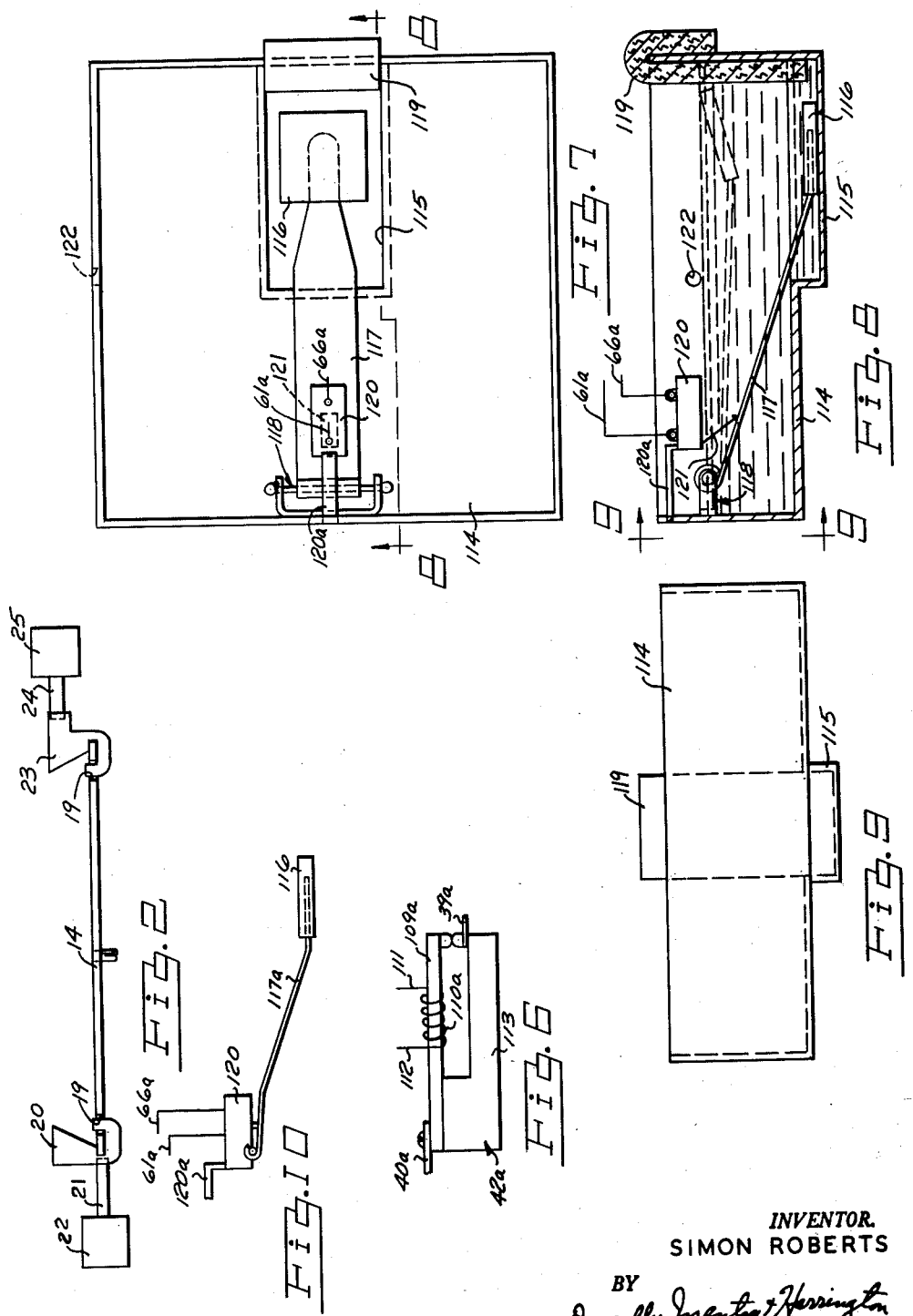
INVENTOR.
SIMON ROBERTS
BY
Donnelly, Mentag & Herrington
ATTORNEYS

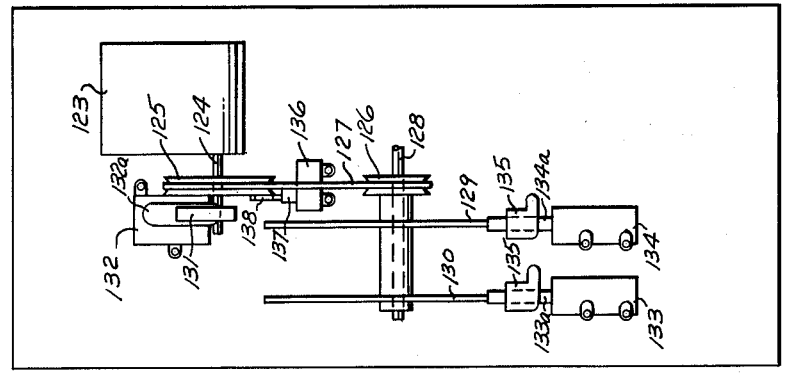

3,063,643
LAWN SPRINKLING CONTROL SYSTEM
Simon Roberts, 20177 McIntyre Ave., Detroit 19, Mich.
Filed Aug. 14, 1958, Ser. No. 754,964
12 Claims. (Cl. 239—70)

This invention relates to improvements in lawn sprinkler systems of the type incorporating a number of separate branch lines with each branch line having a flow control valve for controlling the flow of water through each branch line and, more particularly, to an improved control system for controlling the operation of these branch flow control valves.

It is an important object of this invention to provide an automatic lawn sprinkling control system incorporating a plurality of circuits for controlling a plurality of flow valves and wherein each of the circuits may be timed to operate according to any desired time cycle in accordance with the soil type, the water demands of a given group of plants, and the moisture conditions.

It is another object of this invention to provide an automatic lawn sprinkling control system which is adapted to control a plurality of water flow control valves in any predetermined desired cycle and which may include a number of secondary control elements such as a day skipping clock, a moisture sensing element, and an anti-syphon valve or safety valve.

It is a further object of the present invention to provide an automatic lawn sprinkling control system which incorporates an improved balanced water flow control valve, a moisture sensing device, an electric programming timing clock, and a time delay thermal circuit breaker.

It is a still further object to provide an automatic lawn sprinkling control system which is compact and simple in construction and involves few moving parts, economical of manufacture, efficient in operation, and which can be easily installed without the need for any special skill.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 2 is a diagrammatic view of the timer clock dial and tab mechanism employed in the invention for operating a pair of control switches;

FIG. 3 is an elevational sectional view of a novel balanced water flow control valve employed in the invention;

FIG. 4 is a fragmentary elevational view of the structure illustrated in FIG. 3, taken along the lines 4—4 thereof and looking in the direction of the arrows;

FIG. 5 is a side elevational view, with parts broken away, of the valve shown in FIG. 3 and showing the valve provided with a manual operation means and in the closed position;

FIG. 6 is a side elevational view of a time delay thermal circuit breaker employed in the invention;

FIG. 7 is a top plan view of a novel moisture sensing device employed in the invention;

FIG. 8 is an elevational sectional view of the structure illustrated in FIG. 7, taken substantially along the line 8—8 thereof and looking in the direction of the arrows;

FIG. 9 is an end elevational view of the structure illustrated in FIG. 8, taken along the line 9—9 thereof and looking in the direction of the arrows;

FIG. 10 is a fragmentary schematic side elevational view of a modified float and switch structure which may be employed in the rain sensing device of FIGS. 7 through 9;

FIG. 11 is a front elevational view of a novel electric programming timing clock employed in the invention; and FIG. 12 is a side elevational view of the structure illustrated in FIG. 11, taken along the lines 12—12 thereof and looking in the direction of the arrows.

Figure 1:
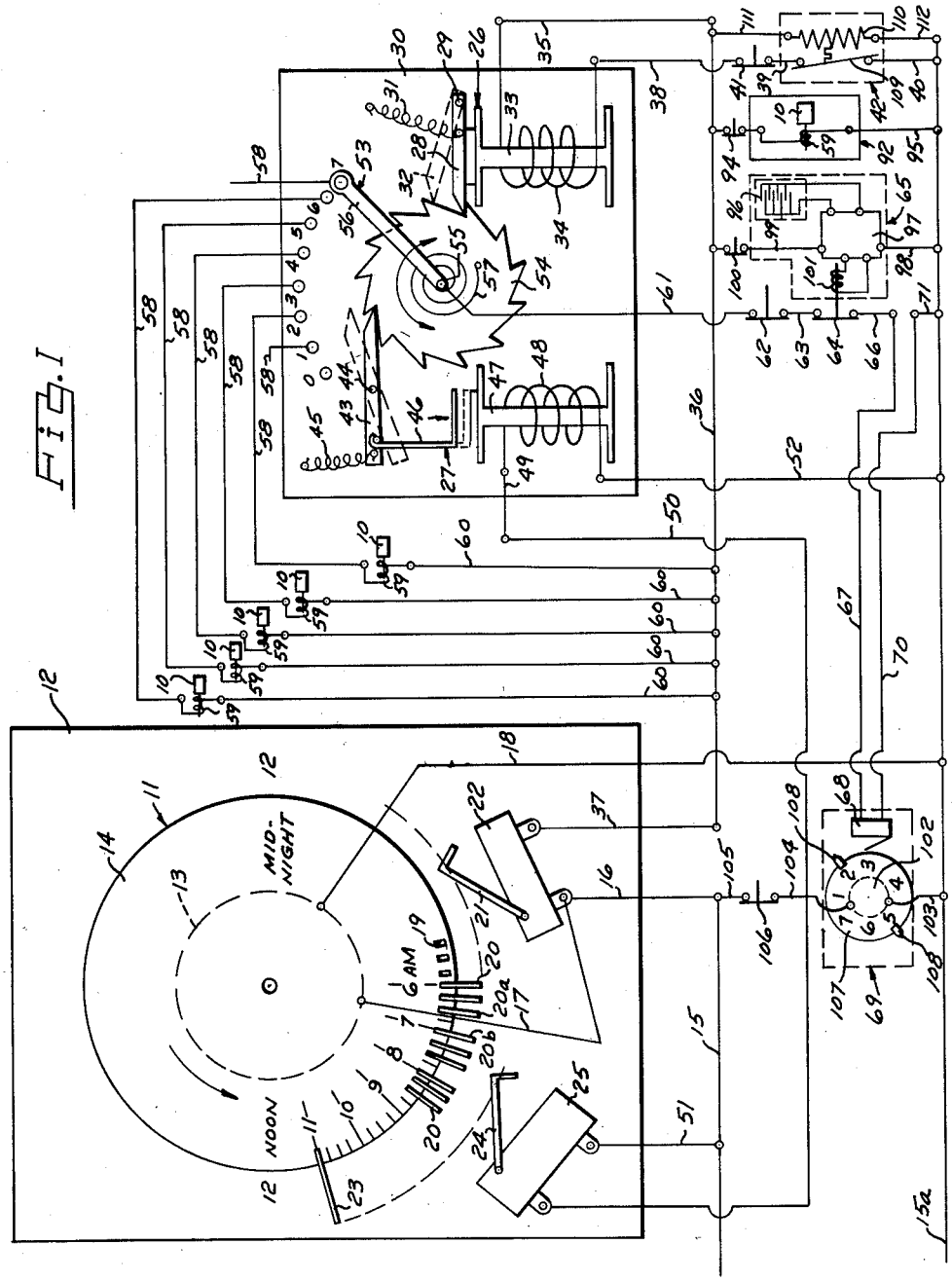
FIG. 1 is a diagrammatic view of an automatic lawn sprinkling control system made in accordance with the principles of the invention.

Referring now to the drawings, a first embodiment of the invention is illustrated in FIGS. 1 through 4. The control system of the present invention is adapted to automatically control the cyclic "on" and "off" operations of a plurality of solenoid operated water flow control valves as 10 in a plurality of branch pipe lines in a lawn sprinkling system. As shown in FIG. 1 the control system includes an electric programming interval timer clock generally indicated by the numeral 11 and adapted to be mounted on a suitable base board as 12.

The timer clock 11 includes a conventional 24 hour timing motor 13 adapted to rotate the timing dial 14 in a counterclockwise direction as indicated by the arrow on the dial. The timing motor 13 may be of any suitable type adapted for operation in typical industrial, commercial or household circuits. One terminal of the timing motor 13 is shown as being connected to the hot line 15 of an electric power supply by means of the lead wires 16 and 17. The other terminal of the timing motor 13 is shown as being connected to the ground line 15a by means of the lead wire 18.

As illustrated in FIG. 2 the dial 14 is provided around the periphery thereof with the usual timing tab slots as 19 in which are detachably mounted a plurality of short timing steps tabs or cams as 20 which are adapted to operatively engage the switch arm 21 of the normally open stepping coil micro-switch 22. As shown in FIGS. 1 and 2 a second size or long tab 23, termed a recycle tab, is detachably mounted in one of the tab slots 19 in a trailing position relative to the step tabs 20. The recycle tab 23 extends radially outwardly from the dial periphery further than the step tabs 20 and is adapted to operatively engage the switch arm 24 of the normally open re-cycle coil micro-switch 25.

As shown in FIG. 1, the micro-switch 22 is adapted to activate the circuit stepping relay generally indicated by the numeral 26, and the micro-switch 25 is adapted to activate the circuit re-cycling or holding relay generally indicated by the numeral 27. The circuit stepping relay comprises the stepping coil armature or pawl 28 which is pivotally mounted on a suitable pivot pin as 29 carried on a base board as 30. The pawl 28 is normally biased by means of the release spring 31 to the upward dotted line position indicated by the numeral 32. The stepping relay 26 further includes the core 33 and the coil 34. One end of the relay coil 34 is connected to one terminal of the micro-switch 22 by means of the lead wires 35, 36, and 37, with the other terminal of the micro-switch 22 being connected by the lead wire 16 to the hot line 15. The other end of the relay coil 34 is connected to the ground line 15a by means of the lead wires 38, 39 and 40, the manually operated, normally closed, switch 41, and the conventional time delay thermal circuit breaker generally indicated by the numeral 42.

The circuit re-cycling relay comprises the anti-return or holding pawl 43 which is pivotally mounted on a pivot pin as 44 carried on the base board 30. The pawl 43 is normally held in the solid line position by means of a suitable tension spring as 45. Hingedly connected at its upper end to the pawl 43 is the re-cycle relay armature 46 for relasing pawl 43. The relay 27 further includes the core 47 and the coil 48. One end of the relay coil 48 is connected to one terminal of the micro-switch 25 by means of the lead wires 49 and 50, with the other terminal of the microswitch being connected by the lead wire 51 to the hot line 15. The other end of the relay coil 48 is connected to the ground line 15a by means of the lead wire 52.

The relays 26 and 27 are adapted to coact with the rotary switch generally indicated by the numeral 53 as more fully described hereinafter. The rotary switch 53 comprises the ratchet wheel 54 which is rotatably mounted on the base board 30 as by means of the shaft 55. The ratchet wheel 54 carries the rotary contact arm 56 which is adapted to engage the fixed contacts of the rotary switch, which are numbered from 1 through 7, as the ratchet wheel is rotated. The ratchet wheel 54 is adapted to be advanced or rotated clockwise, as viewed in FIG. 1, by means of the stepping pawl 28, and to be retracted or rotated counterclockwise to bring the contact arm 56 back to the fixed contact zero by or cycle starting position means of the coil spring 57.

The rotary switch 53 operates a plurality of flow control valve circuits connected to the fixed contacts 1 through 7. It will be understood that more than seven valve circuits could be controlled by simply employing a rotary switch having a greater number of fixed contacts. Any unused fixed contacts as 1 through 7 may be used to control porch lights, driveway lights and so forth.

The contacts 1 through 7 are each connected by means of a lead wire as 58 to one end of the solenoid coil 59 of one of the solenoid flow control valves 10. The other end of each of the solenoid coils 59 is connected to the hot line 15 by means of the lead wires 60, 36, 37, and 16, and the micro-switch 22. The movable contact arm 56 is connected to the ground line 15a through the lead wire 61, the manual cut-out switch 62, lead wire 63, the normally closed solenoid operated switch 64 of the conventional moisture sensing means 65, the lead wires 66 and 67, the normally closed micro-switch 68 of the conventional day skipping clock 69, and, the lead wires 70 and 71.

As shown in FIGS. 3 and 4, the flow control valves 10 employed in the invention are preferably of the balanced type, which requires comparatively little effort to open or close because the water pressure is almost equal in both directions on the valve plungers. The valves 10 comprise a valve body 72 having an entrance port 73 and an exit port 74. The upper end of the body 72 is enclosed by the threadably mounted cap 75. Formed in the lower end of the body 72 is the valve seat 76. The valve 10 further includes the plunger rod 77 having the integral plunger disk 78 formed on the lower end thereof and which is provided with the soft facing 79 on the valve seat engaging surface thereon. Integrally formed on the plunger rod 77 at a spaced apart position above the plunger disk 78 is the second or upper plunger disk 80. A spring 81 is mounted around the rod 77 between the cap 75 and the upper plunger disk 80 and functions to normally bias the plunger downwardly so as to seat the disk 78 on the seat 76 and closed the valve. The upper end of the plunger rod 77 extends through the holes 82 in the cap 75 and is hingedly connected to the yoke member 85 by means of the pin 86. A suitable rubber packing ring 83 is mounted around the plunger rod 77 in the cap 75. The pull rod or solenoid armature rod 87 is integrally connected to the yoke 85 and extends through the hole 89 in the solenoid mounting bracket 88 which is secured to the cap 75 by means of the retainer nut 84. FIG. 5 shows how the valve 10 can be manually operated by disconnecting the pull rod 87 and attaching a pull string or cable as 90 provided with a finger or hook ring 91. It will be understood that any commercial solenoid valve may be used.

In use, the automatic lawn sprinkler control system of the present invention would be operated as described hereafter. The step tabs 20 are placed on the periphery of the dial 14 so as to establish the cyclic pattern as to clock time, duration, and number of circuits required to satisfy the watering requirements of a given system. The re-cycle tab 23 is placed between the last working cycle and the first working cycle. The time clock 11 is then started and the time dial 14 rotates counterclockwise and as the tabs 20 pass over the switch arm 21, they act as cams and hold the switch arm 21 in the closed position. The dial 14 in the illustrative embodiment would be driven at the rate of one revolution in every 24 hours.

When the micro-switch 22 is closed by the camming action of the step tabs 20 a circuit between the power lines 15 and 15a is completed through the stepping relay coil 34. When the relay coil 34 is thus energized, the pawl 28 will be pulled down to the solid line position shown in FIG. 1 against a tooth of the ratchet wheel 54 against the tension of spring 31. Assuming the rotary contact arm 56 was initially set at the start position numbered zero the clockwise rotation of the ratchet effected by the pawl 28 will move the contact arm 56 to the position to make contact with the fixed contact number 1 to energize the solenoid valve 10 connected in series with the fixed contact 1. The relay coil 59 of the solenoid valve 10 connected with the contact 1 would be energized to open its valve and permit water to flow through the branch line in which the valve is connected. It will be seen that when the ratchet 54 is moved clockwise, the holding pawl 43 is adapted to permit the ratchet wheel to be advanced but not to be retracted since the tension spring 45 maintains a force on the pawl 43 to rotate it in a clockwise or holding direction. The solenoid 59 of the valve 10 so energized will be maintained in the energized condition by means of the step tabs 20 being disposed in groups and wherein each tab 20 holds the switch arm 21 down for a 15 minute period. When the last tab 20a of the first group of tabs passes off the switch arm 21 the solenoid 59 of the first valve 10 so energized will be de-energized and its valve will close.

There is a space between the cycle groups of the tabs 20 and the switch arm 21 moves into said space between cycles and is inactive until contacted by the first tab 20b in the next cycle group to re-energize the circuit through the stepping coil 34. The pawl 28 again functions to advance the ratchet wheel on tooth and the contact arm 56 would be moved to the second fixed contact 2 to energize the solenoid of the valve 10 connected in the control circuit connected to the contact 2. It will be seen that the process repeats itself with every cycle group of the tabs 20. The cycling continues until the whole automatic sprinkling cycle is completed. Some time after the last of the cycle tabs 20 have functioned, the recycle tab 23 (shown at 11:00 in FIG. 1) cams the switch arm 24 of the recycle switch 25 to the closed position whereby the relay coil 48 of the recycle relay is energized. When the coil 48 is energized the armature 46 is pulled downwardly thereby pivoting the pawl 43 to the dotted position shown in FIG. 1 and withdrawing it from the ratchet wheel teeth and allowing the coil spring 57 to return the ratchet wheel 54 counterclockwise to the start position indicated by the contact numbered zero. It will be seen that after the ratchet wheel has been set back to the start position the control system is reset to start the complete series of cycles all over again when the first step tab 20 of the first cycle group again comes around to engage the switch arm 21.

It will be seen that the basic control system may include an anti-syphon or safety valve, generally indicated by the numeral 92, which is required by local regulations in some localities. The valve 92 is a solenoid valve which may be identical with the line valve 10, and which is located in the main water line ahead of any of the branch line valves 10 and their operating solenoids. Thus the valve 92 operates as a safety shut off valve, should one of the branch line valves 10 fail. As shown in FIG. 1 the anti-syphon valve would be a conventional solenoid valve which would be connected across the power lines 36 and 15a by means of the manually operated switch 94 and the lead wire 95 whereby the solenoid coil 59 of the safety solenoid will be operated whenever the stepping coil 34 is energized. It will be seen that the anti-syphon valve 92 will open and close simultaneously with each control valve 10. If desired, the anti-syphon valve 92 may be switched to a standby position by merely opening the manual control switch 94. It will be further seen that the basic control system of the present invention may include the conventional moisture sensing apparatus, generally indicated by the numeral 65, and which comprises the usual moisture sensing element 96 adapted to allow to flow a small E.M.F. which is amplified by the usual amplifier means 97 which is connected between the lead wire power line 36 and the ground line 15a by means of the lead wires 98 and 99 and the manually operated switch 100. The moisture sensing device 65 will operate when a sufficient E.M.F. is generated by it to energize the solenoid coil 101 to open the normally closed solenoid operated switch 64 in the valve control common lead wire circuit which connects the movable contact arm 56 with the ground line 15a. The moisture device 65 thus opens the control circuits through the valves 10 during the periods when the ground has sufficient moisture. The moisture sensing device 65 may be cut out of the control system if desired by means of the manually operated switch 100.

As shown in FIG. 1 the basic control system may also include the day skipping clock, generally indicated by the numeral 69, and which includes the timer motor 102 which is connected across the power lines 15 and 15a by means of the lead wires 103, 104 and 105 and the manually operated switch 106. The clock 69 includes the day skipping dial 107 provided with the cams or tabs 108 which operate the switch arm on the normally closed switch 68 to open this switch. The opening of switch 68 opens the common line between the movable contact arm 56 and the ground line 15a whereby the valve control circuits will not be energized when the stepping relay 26 operates. It will be seen that the day skipping clock 69 may be cut out of the basic control system by opening the normally closed manually operated switch 106. The previously mentioned switches 41, 62, 94, and 100 are also normally closed, manually operated switches.

As shown in FIG. 1 the control system is preferably provided with the thermal snap action circuit breaker 42 which functions as a normally closed time delay relay in the stepping coil circuit 34. The thermal snap action circuit breaker 42 includes the movable bi-metallic contact strip 109 which is heated by the heater coil 110 which is connected between the power lines 36 and 15a by means of the lead wires 111 and 112. The thermal snap action circuit breaker contact strip 109 will be heated when the stepping coil 34 is energized and will function to open the coil circuit 34 after a predetermined time delay in the usual manner. This action cuts out the stepping relay coil 34 and prevents it from overheating, since this coil would be continuously energized otherwise because of the switch arm 21 being closed throughout the time each cycle group of tabs 20 engages the switch arm 21. The thermal circuit breaker 42 also provides a secondary beneficial result by eliminating the 60 cycle hum at the relay coil 34 during each watering cycle.

By employing a balanced valve in this system as shown in FIGS. 3, 4 and 5, it is possible to install all of the plumbing and controls so as to be operated manually by the cable 90 before being hooked up to the pull rods 87 of the automatic control system. These valves can also be operated manually if needed for any purpose such as testing the plumbing installation before the electrical circuitry is completed and can be so used in a watering system before converting it to the automatic system. In these valves 10 the soft facing 79 on the lower valve plunger disk 78 functions to reduce the pressure required for full seating of the valve which in turn reduces the required load of the valve seating spring 81 and lowers the power requirements of the solenoid for operating the valve.

A second embodiment of a thermal circuit breaker adapted for use in the control system of the present invention is shown in FIG. 6 and is generally indicated by the numeral 42a. This second type thermal circuit breaker is constructed with substantially the same parts of the first illustrated circuit breaker 42 and the corresponding parts are marked with the same reference numerals followed by the small letter "a." The various parts of this circuit breaker 42a are mounted on the base block 113. In this circuit breaker embodiment of FIG. 6 the heater coil 110a is wrapped around the bi-metallic contact strip 109a instead of being disposed to the side thereof. It will be seen that this novel second type circuit breaker provides a heater coil which is cold during the cut out period whereby the life of the relay coil 34 will be extended and the entire timing portion of the system itself may be more compact and can be installed in a smaller container which can be dust sealed. The circuit breaker heater 110a gives off much less heat than the solenoid coil 34.

A novel rain quantity evaluating and sensing device is illustrated in FIGS. 7, 8 and 9 and can be incorporated in the basic control system illustrated in FIG. 1 in the manner described hereinafter. The rain sensing device includes the large rain collecting pan 114 which would be mounted in a location where it would be exposed to the weather so as to collect rain. A smaller magnifier pan 115 is connected to the bottom of the larger pan 114 at one end thereof. The larger pan 114 is approximately eight times larger in volume than the pan 115. A float 116 is adapted to be carried by the float arm 117 which is pivotally hinged on the pivot hinge structure generally indicated by the numeral 118. A wick 119 with approximately the same evaporization rate as the average existing turf and weather conditions is mounted in the pan 114 with the lower end thereof extended down into the small pan 115. Fixedly supported in the larger pan 114, as by means of the arm 120a, is a micro-switch 120 having a switch arm 121 adapted to be engaged by a float arm 117 when the float 116 moves upwardly due to the pans being filled with water. The switch 120 is a normally closed switch and would be connected by means of the lead wires 61a and 66a into the control circuit of FIG. 1 in lieu of the moisture sensing device 65. The large pan 114 would be provided with a drain hole 122 spaced upwardly from the bottom thereof a distance determined by the requirements of rainfall in inches for average conditions in the locality where the device is used. The volumetric ratios between the large and small pans can vary for more or less sensitivity, as desired.

The rain sensing device operates in the following manner. If a light drizzle should occur and a 32nd of an inch of water is caught in the large pan 114, the water will flow into the small pan 115 which will then have a depth of water therein of about one-quarter inch due to the differential in area between the pans. The float 116 will then rise against the actuator arm 121 of the switch 120 and open the circuit from the movable contact arm 56 to the ground wire 15a whereby the valve circuits will be opened. The aforementioned circuits will remain open until the cloth wick 119 removes the water from the pan 115 and the rain having stopped does not replace the water. If the rain continues, the overtravel of the switch arm 121 will hold the aforementioned circuit open until the water evaporates. Thus if one-half inch or more of water is held in the pans and does not evaporate in time for the switch 120 to close, then the circuit between the movable contact arm 56 and ground line 15a remains open. Then for all practical purposes the watering requirements have been met and the moisture switch has served its purpose. If the weather is so humid and cool that the water in the pans does not evaporate readily, there is no problem because the evaporization from the ground is approximately the same as that from the pan and wick.

FIG. 10 illustrates a slight modification of the rain sensing device of FIGS. 7, 8 and 9. The device of FIG. 10 shows the float arm 117 and the switch actuating arm 121 combined into an integral part numbered 117a. The rest of the structure would be the same as in FIGS. 7, 8 and 9, except for the omission of hinge structure 118.

FIGS. 11 and 12 are schematic illustrations of an improved programming clock for activating the stepping and recycle coils 34 and 48 in the basic control system illustrated in FIG. 1. The numeral 123 indicates the conventional timing motor adapted to make one revolution every 24 hours. Fixedly mounted on the drive shaft 124 of the timing motor 123 is a drive pulley 125 which is adapted to drive the driven pulley 126 by means of the drive belt 127. The driven pulley 126 is one-half the diameter of the drive pulley 125 and revolves once in every 12 hours. The pulleys 125 and 126 and belt 127 may be replaced with equivalent gears and drive chains or the like. The driven pulley 126 is fixedly mounted on the shaft 128 which may be supported by any suitable means and which is adapted to drive the timing dials 129 and 130 which are both identical to the timing dial 14 shown in FIG. 1. The dials 129 and 130 are recalibrated to read 12 hours instead of 24 hours. The dial 130 would control the midnight to noon cycle and the dial 129 would control the noon to midnight cycle.

Fixedly mounted on the timing motor shaft 124 is the 12 hour circuit switching cam 131 which makes one revolution every 24 hours. The switch cam 131 is adapted to operate the switch arm 132a of the switch 132 which is of a make before break type switch which completes a new circuit the instant the old circuit breaks. The numerals 133 and 134 indicate a pair of switches for operating the stepping relay coil 34 in a control circuit for the midnight to 12 noon and noon to midnight periods, respectively. The dials 129 and 130 are provided with stepping tabs 135 which are the same as the tabs 20 shown in FIG. 1. The numeral 136 indicates a normally open micro-switch having the contact arm 137 which is engageable by means of the tab or recycle cam 138 carried on the pulley 125. The switch 136 operates in the same manner as the switch 25 in the first timing clock embodiment shown in FIG. 1.

The timing clock of FIGS. 11 and 12 operates in the following described manner. The motor 123 and pulley 125 and cam 131 rotate once in every 24 hours. The cam 131 has a contact face of 180 degrees or a 12 hour contact area. As the cam 131 rotates it first makes contact with the normally open side of the switch 132. The normally open side of the switch 132 is connected by means of the lead line 139 with one terminal on the switch 134. The other terminal of the switch 134 is connected to the lead line 36 of the circuit of FIG. 1. The switch 132 is connected to the power line 15 by means of the lead line 140. The switch 134 is adapted to operate all 12 hour control cycles set up on the timing dial 129 and is provided with the contact arm 134a for engagement by the tabs 135 on the dial 129. At the end of 12 hours the normally open switch contact arm 132a drops off of the cam contact face of cam 131 and switch 133 is then controlled by the switch 132 through the lead line 141 which is connected to one terminal of the switch 132. The other terminal of the switch 133 is connected to the lead line 36 going to the stepping coil 34. During the next 12 hour period the control cycles set up on the dial 130 will be carried out through the switch 133.

It will be seen that by having two dials as 129 and 130 and rotating them with a pulley or gear 126 having one-half the ratio of the drive pulley 125, the minimum "on" or "off" cycle can be reduced to seven and one-half minutes or even five minutes allowing for much greater flexibility of control. In effect, a 24 hour timing dial is calibrated down to 12 hours.

A conventional day skipping clock adapted for use in the invention for the clock 69 is one available on the market by the Intermatic Inc., and identified as model T-171. A suitable moisture sensing device for the device 65 is one available on the market by the Allied Radio Corporation of Chicago and known as the Eltronics humidity senser. A suitable thermostatic delay relay for use as the device 42 is one available on the market and known as an Amperite thermo-static delay relay model 115C2.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In an automatic lawn sprinkling control system for opening and closing flow control valves in a cyclic order, the combination of, a timing clock mechanism including timing dial means having a plurality of timing step tabs detachably mounted on said dial means and at least one recycle tab mounted on said dial means; a plurality of flow control valves; a plurality of solenoids for operating said valves; a rotary switch mechanism for completing a circuit through each of said solenoids in a cyclic order for energizing the same; said rotary switch mechanism including a stationary base, a ratchet rotatably mounted on said base, and a contact arm fixedly connected to said ratchet, for completing the circuits through said solenoids; said rotary switch mechanism further including a spring interconnected between said base and said ratchet for maintaining a retractive force on the ratchet for normally rotating said ratchet in a retracting direction back to a cycle starting position; a first relay operated pawl mounted on said base for rotating the ratchet in an advancing direction away from said cycle starting position; a first switch mechanically operated by said timing step tabs for completing a circuit to actuate said first relay operated pawl; a second relay operated pawl for holding the ratchet in an advanced position against the retractive force of said spring; and, a second switch mechanically operated by said recycle tab for completing a circuit to actuate said second relay operated pawl to release the ratchet and allow the spring to return the ratchet and the contact arm back to said cycle starting position.

2. The invention as defined in claim 1, wherein: said automatic lawn sprinkling control system includes a thermal circuit breaker for opening the circuit to actuate said first relay operated pawl after a delay period sufficient to allow the first relay operated pawl to operatively engage said ratchet.

3. The invention as defined in claim 1, wherein: said automatic lawn sprinkling control system includes an anti-syphon valve interconnected in the water supply line ahead of and in series with said plurality of flow control valves; and, said anti-syphon valve includes a solenoid connected in the circuit which actuates the first relay operated pawl, whereby the anti-syphon valve will be operated as each of said solenoids for operating said flow control valves is activated.

4. The invention as defined in claim 1, wherein: said automatic lawn sprinkling control system includes a day-skipping means interconnected in the circuit for energizing the plurality of solenoids for operating said flow control valves, for disabling this circuit in a cyclic order.

5. The invention as defined in claim 1, wherein: said flow control valves are constructed with a balanced plunger means operating with a straight line motion.

6. The invention as defined in claim 1, wherein: said timing clock dial means includes a single timing dial on which the plurality of timing step tabs are detachably mounted and on which the recycle tab is mounted.

7. The invention as defined in claim 1, wherein: said timing clock dial means includes a plurality of timing dials with said plurality of timing step tabs being mounted on a pair of dials and said recycle tab being mounted on a separate dial.

8. The invention as defined in claim 1, wherein: said automatic lawn sprinkling control system includes a thermal circuit breaker for opening the circuit to actuate said relay operated pawl after a delay period sufficient to allow the first relay operated pawl to operatively engage said ratchet; an anti-syphon valve interconnected in the water supply line ahead of and in series with said plurality of flow control valves, and said anti-syphon valve including a solenoid connected in the circuit which actuates the first relay operated pawl, whereby the anti-syphon valve will be operated as each of said solenoids for operating said flow control valves is activated; and, a day-skipping means and a rain quantity evaluating and sensing device interconnected in the circuit for energizing the plurality of solenoids for operating said flow control valves, for disabling this circuit in a cyclic order and also when sprinkling is not required because of excessive available moisture supplied by rain.

9. The invention as defined in claim 1, wherein: said automatic lawn sprinkling control system includes a moisture sensing device interconnected in the circuit for energizing the plurality of solenoids for operating said flow control valves, for disabling this circuit when sprinkling is not required because of moisture supplied by rain or by the sprinkling system itself.

10. The invention as defined in claim 1, wherein: said automatic lawn sprinkling control system includes a rain quantity evaluating and sensing device interconnected in the circuit for energizing the plurality of solenoids for operating said flow control valves, for disabling this circuit when sprinkling is not required because of excessive available moisture supplied by rain.

11. The invention as defined in claim 10, wherein said rain quantity evaluating and sensing device includes a switch connected in the circuit for energizing the plurality of solenoids for operating said flow control valves, a pan for catching rain water, a float arm carrying a float engageable by rain water in the pan, said float arm being hinged in the pan and operable to open said last named switch for disabling said last named circuit when the rain water caught in said pan raises the float arm, and, a wick mounted in said pan in contact with the rain water for evaporating the same.

12. The invention as defined in claim 11, wherein: said float arm is formed as an extension of the switch arm of the switch operated by the float.

References Cited in the file of this patent
UNITED STATES PATENTS

| | | |
|---|---|---|
| 2,569,432 | Halford | Sept. 25, 1951 |
| 2,578,981 | Parker | Dec. 18, 1951 |
| 2,611,643 | Higgins | Sept. 23, 1952 |
| 2,721,101 | Richard | Oct. 18, 1955 |
| 2,812,976 | Hasenkamp | Nov. 12, 1957 |
| 2,864,650 | Delamater | Dec. 16, 1958 |
| 2,875,428 | Griswold | Feb. 24, 1959 |